April 15, 1941.  R. STANSFIELD  2,238,234
PRESSURE INDICATOR
Filed Sept. 23, 1937
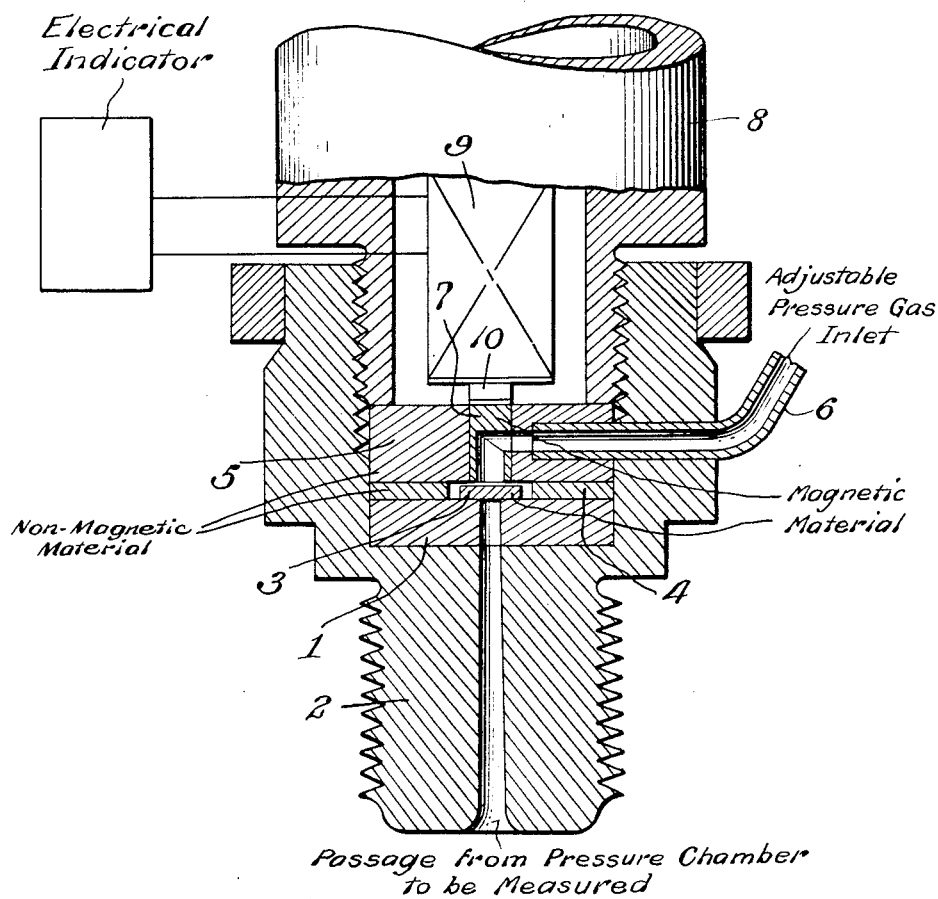

Patented Apr. 15, 1941

2,238,234

UNITED STATES PATENT OFFICE 2,238,234

PRESSURE INDICATOR

Richard Stansfield, Teddington, Middlesex, England, assignor to International Standard Electric Corporation, New York, N. Y.

Application September 23, 1937, Serial No. 165,303
In Great Britain October 27, 1936

2 Claims. (Cl. 177—311)

This invention relates to pressure indicators of the kind in which a diaphragm or a disc is operated against an applied air pressure by pressure to be indicated, so that the movement of the diaphragm or disc begins when the pressure being indicated just equals the applied air pressure. In known indicators of this type the disc or diaphragm is used to make or break an electrical circuit, the current in which is thereupon caused to operate an indicator either directly or after amplification.

Such indicators are unsatisfactory because the contact surface of the disc soon becomes pitted and ultimately gives erratic contact. Moreover, the contact is not effectively broken until after the disc has moved an appreciable distance and thus there is a time lag between the point which has to be indicated and the actual break of the electrical circuit. Such indicators, therefore, cannot give a correct indication of the pressure in apparatus in which the pressure changes very rapidly, for example in internal combustion engines that are working at very high speeds.

In accordance with the present invention, the movement of the disc or diaphragm in either direction is caused to operate electrical indicating means by causing a change of magnetic flux, linked with an electric circuit connected to an electric indicator. An indication is thus given when movement of the disc or diaphragm takes place in either direction. By this means a very light disc may be used which instantaneously responds to a change of pressure above or below that for which it is set to operate.

The nature of the invention will be better understood from the following description of one embodiment thereof taken in conjunction with the accompanying drawing, which shows a unit constructed according to the invention and adapted to be inserted in a suitable aperture in the cylinder of an internal combustion engine. This unit consists of a body 2 provided with an external screw-thread for screwing into an aperture in the cylinder of an internal combustion engine, such as is provided for a known type of indicating unit intended to give a continuous record on a cathode ray tube connected thereto. The body 2 is provided with a seating in which is placed a plate 1, this plate and the body 2 being drilled with a small hole of, for example, $\frac{1}{16}$ inch diameter. Instead of being inserted in an aperture in an engine cylinder, the body 2 may be applied to the end of a small hole drilled through a cylinder or a cylinder head flange and be supported on an external bracket. A small disc 3 of magnetic material and of very light weight, e. g. 30 milligrammes, rests over the hole in the plate 1 and is surrounded by an annular disc 4 of non-magnetic material which is slightly thicker than the disc 3, for example, $\frac{4}{1000}$ inch thicker. An upper plate 5 of non-magnetic material is clamped above the annular disc 4 and limits the movement of the disc 3 to the short distance mentioned. A pole piece 7 of magnetic material is held centrally in the plate 5 and is drilled half way through as shown with a hole equal in diameter to that provided in the plate 1. This hole engages with a small pipe 6 terminating in a union which is coupled to an air reservoir and a pressure gauge. The pressure in the air reservoir is set at the pressure at which an indication is required. In the upper part of the adaptor 2 is screwed a body 8 containing a coil 9 surrounding a central core 10 which is placed against the pole piece 7. The coil 9 is then connected in an electric circuit in any desired manner. This coil may, for example, be connected in such a way that upon the passage of an induced current therethrough, the potential on the grid of a grid controlled gas-filled tube is raised sufficiently to initiate a discharge therethrough, and thus operate an indicating instrument of any desired type such for example, as is used in the well known Farnboro indicator which is described in the book "The Testing of High Speed Combustion Engines," by A. W. Judge, on pages 236, et seq., first edition 1924. The coil 9, may on the other hand, be connected in such a way that the voltage induced across the terminals thereof, after amplification, if necessary, is applied to one pair of deflecting plates of a cathode ray tube, the other pair of deflecting plates being supplied with voltage derived from any form of time base circuit, which may in known manner be arranged to be synchronised with the apparatus in which the pressure is being measured. In this way, for example, the precise position in the cycle of movement of an internal combustion engine at which the pressure within the cylinder is at any given value, may be determined. If the unit shown is applied to the cylinder of an internal combustion engine and the engine run under the load and speed conditions for which a calibration is required, the disc 3 lifts each time the cylinder pressure exceeds the air pressure applied through the pipe 6 and falls again when the pressure drops below the applied air pressure. Each movement of the disc 3 causes a rapid change of flux in the core 10 and thus induces a momentary current in the coil 9. As the air pressure is increased the currents obtained by the movement of the disc 3 as the disc lifts and then falls again, occur closer and closer together and when the maximum cylinder pressure is reached they merge and disappear. The pressure at which disappearance just takes place is the maximum cylinder pressure. When this pressure has been determined by means of an indication on a cathode ray tube the unit shown may be replaced by a unit giving an electric current which is a measure of the rate of change of pressure in the engine cylinder at any point in the cycle. This current may, by the use of the circuit described in U. S. application Ser. No. 69,808, filed March 20, 1936, be made to give a displacement of the cathode ray which is proportional to the pressure. The scale of the pressure diagram obtained on the screen of the cathode ray tube may then be determined, since the actual value of the maximum pressure is now known. Apparatus by which a pressure diagram of the known kind may be obtained is described in an article entitled "The Standard Sunbury Indicator," published in the "Engineer," for December 13, 20 and 27, 1935.

It is clear, however, that the invention is not restricted to such use and is applicable to any form of indicator which it is desired to indicate the position in a cycle of events with which the pressure to be indicated is associated at which this pressure attains a given value.

The invention is, for example, applicable to the measurement of the pressure in a liquid fuel system or similar hydraulic pressure system. In such case, however, it is advisable to form the disc 3 as a short cylinder in order that it may be more easily guided in its movement. The upper and lower faces of the cylinder should be recessed so that it only makes contact with its seating around the edges. This is to reduce capillary attraction and other seat effects which may be appreciable with liquids.

What is claimed is:

1. A pressure indicator comprising a member having a first passage for connection with a pressure chamber, the pressure of which is to be indicated, and a second passage for connection to an adjustable pressure supply means, a magnetic pole piece, a winding linking the flux passing through said pole piece, a light member of magnetic material consisting of a disc arranged for substantially instantaneous free movement into either of two positions between said first and second passages upon departure from equality of said pressure to be indicated and said adjustable pressure and in the magnetic path of said pole piece, whereby upon said pressure to be measured rising above or dropping below equality with the pressure supplied from said adjustable pressure supply means movement of said disc varies the flux linking said winding and an electrical impulse is induced in said winding.

2. A pressure indicator comprising a body having a passage for communication with a chamber, the pressure of which is to be indicated, a light weight disc of magnetic material loosely seated on one end of said passage within said body, an annular plate of non-magnetic material surrounding said disc and of slightly greater thickness than said disc, an upper plate held against the surface of said annular plate and containing a magnetic pole piece aligned with said magnetic disc, said upper plate having a passage drilled through it for connection to an air reservoir of predetermined adjustable pressure, a magnet carrying an electric winding mounted above said magnetic pole piece and arranged so that movement of said disc of magnetic material varies the magnetic flux linking said winding and thereby induces a voltage in said winding.

RICHARD STANSFIELD.